United States Patent [19]
Torrey et al.

[11] Patent Number: 6,145,123
[45] Date of Patent: Nov. 7, 2000

[54] TRACE ON/OFF WITH BREAKPOINT REGISTER

[75] Inventors: James M. Torrey, Austin; John M. Prickett, Manchaca; Jim L. Lloyd, Austin, all of Tex.

[73] Assignee: Advanced Micro Devices, Inc., Sunnyvale, Calif.

[21] Appl. No.: 09/108,531

[22] Filed: Jul. 1, 1998

[51] Int. Cl.$^7$ .................................................. G06F 9/445
[52] U.S. Cl. ................................ 717/4; 703/28; 712/227; 714/30; 714/35; 714/37; 714/38; 714/45
[58] Field of Search .................... 712/227; 703/23, 703/26, 27, 28; 717/4; 714/27, 28, 30, 33, 34, 35, 37, 38, 39, 40, 42, 44, 45, 47, 51

[56] References Cited

U.S. PATENT DOCUMENTS

| | | | |
|---|---|---|---|
| 3,707,725 | 12/1972 | Dellheim | 444/1 |
| 4,429,368 | 1/1984 | Kurii | 364/580 |
| 4,462,077 | 7/1984 | York | 364/300 |
| 4,598,364 | 7/1986 | Gum et al. | 364/300 |
| 4,811,208 | 3/1989 | Myers et al. | 711/132 |
| 5,058,114 | 10/1991 | Kuboki et al. | 371/19 |
| 5,084,814 | 1/1992 | Vaglica et al. | |
| 5,321,828 | 6/1994 | Phillips et al. | 395/500 |
| 5,355,369 | 10/1994 | Greenbergerl et al. | 371/22.3 |
| 5,357,626 | 10/1994 | Johnson et al. | 395/500 |
| 5,371,689 | 12/1994 | Tatsuma | 364/569 |
| 5,394,544 | 2/1995 | Motoyama et al. | 395/575 |
| 5,488,688 | 1/1996 | Gonzales et al. | 395/183.1 |
| 5,491,793 | 2/1996 | Somasundaram et al. | 395/183.21 |
| 5,530,804 | 6/1996 | Edgington et al. | 395/183.06 |
| 5,533,192 | 7/1996 | Hawley et al. | 395/183.04 |
| 5,544,311 | 8/1996 | Harenberg et al. | 395/183.16 |
| 5,584,038 | 12/1996 | Papworth et al. | 395/800 |
| 5,590,354 | 12/1996 | Klapproth et al. | 395/800 |
| 5,615,331 | 3/1997 | Toorians et al. | 395/182.07 |
| 5,630,102 | 5/1997 | Johnson et al. | 395/500 |
| 5,642,479 | 6/1997 | Flynn | 395/183.21 |

(List continued on next page.)

FOREIGN PATENT DOCUMENTS

| | | |
|---|---|---|
| 0 316 609 A2 | 5/1989 | European Pat. Off. . |
| 0 530 816 A3 | 3/1993 | European Pat. Off. . |
| 0 636 976 A1 | 2/1995 | European Pat. Off. . |
| 0 762 276 A1 | 3/1997 | European Pat. Off. . |
| 0 849 670 A1 | 6/1998 | European Pat. Off. . |
| 59-194245 | 11/1984 | Japan . |

OTHER PUBLICATIONS

OJennes, Dan, "Debugging With Real–Time Trace", Embedded Systems Programming, Aug. 1997, pp. 50–58.

O'Farrell, Ray, "Choosing a Cross–Debugging Methodology", Embedded Systems Programming, Aug. 1997, pp. 84–89.

Ganssle, Jack G., "Vanishing Visibility, Part 2", Embedded Systems Programming, Aug. 1997, pp. 113–115.

(List continued on next page.)

*Primary Examiner*—Kakali Chaki
*Attorney, Agent, or Firm*—Zagorin, o'Brien & Graham, L.L.P.

[57] ABSTRACT

An information processing system such as a microprocessor includes a processor core, a debug register circuit and a trace unit. The processor core is for processing information according to a program. The program includes a plurality of instructions for execution by the processor core. Each of the plurality of instructions has a corresponding address. The debug register circuit is coupled to the processor core. The debug register circuit includes a dedicated initiate trace breakpoint register coupled to receive and store an initiate trace address and a dedicated terminate trace breakpoint register coupled to receive and store a terminate trace address. The trace unit is coupled to the debug register circuit and the processor core. The trace unit initiates a program trace responsive to the program accessing the initiate trace address. The trace unit terminates the program trace responsive to the program accessing the terminate trace address. The program trace includes information regarding the execution of the program by the microprocessor.

34 Claims, 6 Drawing Sheets

U.S. PATENT DOCUMENTS

| | | | |
|---|---|---|---|
| 5,724,505 | 3/1998 | Argade et al. | 714/45 |
| 5,740,413 | 4/1998 | Alpert et al. | 712/227 |
| 5,751,942 | 5/1998 | Christensen et al. | 395/183.14 |
| 5,752,013 | 5/1998 | Christensen et al. | 395/568 |
| 5,764,885 | 6/1998 | Sites et al. | 395/183.21 |
| 5,768,152 | 6/1998 | Battaline et al. | 364/551.01 |
| 5,771,240 | 6/1998 | Tobin et al. | 371/22.1 |
| 5,774,684 | 6/1998 | Haines et al. | 395/309 |
| 5,774,708 | 6/1998 | Klinger | 395/568 |
| 5,802,272 | 9/1998 | Sites et al. | 395/183.21 |
| 5,809,293 | 9/1998 | Bridges et al. | 712/227 |
| 5,812,562 | 9/1998 | Baeg | 371/22.31 |
| 5,828,824 | 10/1998 | Swoboda | 395/183.01 |
| 5,828,825 | 10/1998 | Eskandari et al. | 395/183.03 |
| 5,848,264 | 12/1998 | Baird et al. | 395/500 |
| 5,867,644 | 2/1999 | Ranson et al. | 395/183.15 |
| 5,889,981 | 3/1999 | Betker et al. | 712/227 |
| 5,901,283 | 5/1999 | Kanzaki | 395/183.14 |
| 5,931,956 | 8/1999 | Neff | 714/34 |
| 5,943,498 | 8/1999 | Yano et al. | 395/704 |
| 5,954,435 | 9/1999 | Yoshida | 365/200 |
| 5,963,737 | 10/1999 | Mealey et al. | 712/244 |
| 5,978,902 | 11/1999 | Mann | 712/227 |
| 5,978,937 | 11/1999 | Miyamori et al. | 714/45 |
| 6,035,422 | 3/2000 | Hohl et al. | 714/35 |
| 6,041,406 | 3/2000 | Mann | 712/227 |

OTHER PUBLICATIONS

Am29040™, "29K Family", Microprocessor User's Manual, Advanced Micro Devices, Inc. 1994, pp. 12–1 through 12–26.

Revill, Geoff, "Advanced On–chip Debug for ColdFire Developers", Embedded System Engineering, Apr./May 1997, pp. 52–54.

Larus, James R., "Efficient Program Tracing", 8153 Computer, No. 5, Los Alamitos, CA, May 26, 1993, pp. 1–10.

IBM Technical Disclosure Bulletin, "Tailorable Embedded Event Trace", vol. 34, No. 7B, Dec. 1991, pp. 259–261.

Motorola, "Personal Computer–BDM Connection", MEVB Quick Start Guide, pp. 3–5 and 7–2 (admitted prior to Apr. 8, 1997).

Motorola, "CPU32 Reference Manual", Section 7 Development Support, pp. 7–1 through 7–13 (admitted prior to Apr. 8, 1997).

U.S. application No. 08/949,897, filed Oct. 14, 1997, entitled "Trace Cache for Microprocessor Based Devices" by Daniel Mann.

U.S. application No. 08/923,597, filed Aug. 25, 1997, entitled "Software Debug Port for a Microprocessor" by Daniel Mann and Carl Wakeland.

IEEE Transactions on Nuclear Science, "A Real Time Integrated Environment for Motorola 680xx–based VME and FASTBUS Modules", vol. 36, No. 5, Oct. 1989, pp. 1701–1705.

K5 HDT, Jan. 11, 1997, pp. 1–6.

IBM Technical Disclosure Bulletin, "Trace Array", vol. 35, No. 2, Jul. 1992, pp. 138–140.

Bannatyne, "Debugging aids for systems–on–a–chip", Northcon/98, IEEE, 1998, pp. 159–163.

Williams, "Paths opening to real–time trace capability on ASIC cores", Electronic Design, Mar. 1997, pp. 112–114.

Haller, "On–chip–debug Simplifies Embedded–System test", Test & measurement world, Jun. 1997, pp. 65–70.

Handley, "On–chip–debugging lets designers roll", EE Times, Sep. 1997, p. 128.

Collins, "ICE mode and the Pentium Processor", Dr. Dobb's Journal, Nov. 1997, pp. 121–123.

Sharp, "JTAG emulation systems explore embedded cores", EE times, Jun. 1998, p. 62.

Adshead, "JTAG accelerates debugging process", EE Times, Jun. 1998, p. 106.

Bacharowski, "EJTAG port can simplify prototyping", EE Times, Feb. 1998, p. 88.

Rakesh K. Agarwal, "80×86 Architecture and Programming, vol. II: Architecture Referene," Englewood Cliffs, New Jersey 1991 pp. 169–177.

John H. Crawford and Patrick P. Gelsinger, "Programming the 80386," SYBEX, Inc., San Francisco, California, 1987, pp. 631–641.

"Pentium ™ Processor User's Manual, vol. 3: Architecture and Programming Manual," Intel Corporation, Mt. Prospect, Illinois, 1993, pp. 17–1 through 17–9.

TRACE ON/OFF WITH BREAKPOINT REGISTER

CROSS-REFERENCE TO RELATED APPLICATIONS

This application relates to United States provisional application, Ser. No. 60/043,070, client docket No. TT1800, filed on Apr. 8, 1997, entitled "Trace Cache for a Microprocessor-Based Device," and which is incorporated herein by reference.

BACKGROUND

1. Field of the Invention

The present invention relates generally to tracing program execution in information processing systems such as computer systems and microprocessors, and, more particularly, to turning trace functions on and off using breakpoint register architecture.

2. Description of the Related Art

Computer systems are information handling systems which may be found in many forms including, for example, mainframes, minicomputers, workstations, servers, personal computers, network computers, terminals, hand-held systems and embedded systems. A typical computer system includes at least one processing unit, associated memory and a number of input/output (I/O) devices. An exemplary processing unit may include one or more microprocessors. An embedded system is a special purpose computer system that is built into another device and that may or may not have the various elements of typical standalone computer systems. An embedded system is a part of the larger system and performs some of the requirements of the larger system.

A typical computer system processes information according to a program (a sequence of internally stored instructions such as a particular application program and/or an operating system) and produces resultant output information via I/O devices if present. Typically, a program counter of the processor of the computer system provides a series of memory addresses which are used by the processor for fetching instructions stored in the associated memory to obtain the instructions. For each memory access, the processor conveys the memory address to the memory over an address bus and the memory responds by conveying to the processor over an instruction/data bus the instruction stored in the corresponding addressed memory location. The instructions stored in the memory constitute the program for the processor. Multitasking processors typically include many "concurrently" executing programs or processes.

During program development, it is advantageous to verify the correctness of program instructions stored in the memory to be executed by the processor. However, the growth in software complexity, coupled with increasing processor clock speeds, has placed an increasing burden on application software developers. The cost of developing and debugging new software products is now a significant factor in processor selection. A processor's failure to adequately facilitate software debug results in longer customer development times and reduces the processor's attractiveness for use within industry. The need to provide software debug support is particularly acute within the embedded products industry, where specialized on-chip circuitry is often combined with a processor core.

In addition to the software engineer, other parties are also affected by debug tool configuration. These parties include: the trace algorithm developer who must search through captured software trace data that reflects instruction execution flow in a processor; the in-circuit emulator developer who deals with problems of signal synchronization, clock frequency and trace bandwidth; and the processor manufacturer who does not want a solution that results in increased processor cost or design and development complexity.

With desktop systems, complex multitasking operating systems are currently available to support debugging. However, the initial task of getting these operating systems running reliably often requires special development equipment. While not the standard in the desktop environment, the use of such equipment is often the approach taken within the embedded industry. Logic analyzers, read-only memory (ROM) emulators and in-circuit emulators (ICE) are frequently employed. In-circuit emulators do provide certain advantages over other debug environments, offering complete control and visibility over memory and register contents, as well as overlay and trace memory in case system memory is insufficient. Use of traditional in-circuit emulators, which involves interfacing a custom emulator back-end with a processor socket to allow communication between emulation equipment and the target system, is becoming increasingly difficult and expensive in today's age of exotic packages and shrinking product life cycles.

Assuming full-function in-circuit emulation is required, there are a few known processor manufacturing techniques able to offer the required support for emulation equipment. Most processors intended for personal computer (PC) systems utilize a multiplexed approach in which existing pins are multiplexed for use in software debug. This approach is not particularly desirable in the embedded industry, where it is more difficult to overload pin functionality.

Other more advanced processors multiplex debug pins in time. In such processors, the address bus is used to report software trace information during a BTA-cycle (Branch Target Address). The BTA-cycle, however, must be stolen from the regular bus operation. In debug environments where branch activity is high and cache hit rates are low, it becomes difficult to hide the BTA-cycles. The resulting conflict over access to the address bus necessitates processor throttle back to prevent loss of instruction trace information. In the communications industry, for example, software typically makes extensive use of branching and suffers poor cache utilization, often resulting in 20% throttle back or more. This amount of throttling is unacceptable amount for embedded products which must accommodate real-time constrains.

In another approach, a second trace or slave processor is combined with the main processor, with the two processors operating in-step. Only the main processor is required to fetch instructions. The second, slave processor is used to monitor the fetched instructions on the data bus and keeps its internal state in synchronization with the main processor. The address bus of the slave processor functions to provide trace information. After power-up, e.g., via a JTAG (Joint Test Action Group) input, the second processor is switched into a slave mode of operation. Free from the need to fetch instructions, its address bus and other pins provide the necessary trace information.

Another existing approach involves building debug support into every processor, but only bonding-out the necessary signal pins in a limited number of packages. These specially packaged versions of the processor are used during debug and replaced with the smaller package for final production. This bond-out approach suffers from the need to support additional bond pad sites in all fabricated devices.

This can be a burden in small packages and pad limited designs, particularly if a substantial number of extra pins are required by the debug support variant. Additionally, the debug capability of the specially packaged processors is unavailable in typical processor-based production systems.

Yet another approach includes the Background Debug Mode (BDM) implemented by Motorola, Inc. of Schaumburg, Ill. In BDM, limited on-chip debug circuitry is provided for basic run control. Through a dedicated serial link requiring additional pins, this approach allows a debugger to start and stop the target system and apply basic code breakpoints by inserting special instructions in system memory. Once halted, special commands are used to inspect memory variables and register contents. This serial link, however, does not provide trace support—additional dedicated pins and expensive external trace capture hardware are required to provide instruction trace data.

Another often-used tool for debugging a computer system and/or computer software is the setting of breakpoints at selected addresses of the software. The breakpoints trap the flow of the software, such as whether, when and how certain portions of a software are entered and exited. From the flow, the behavior of the software can be examined. Setting breakpoints also facilitates debugging and development of a computer or a computer software by allowing trial values to be injected at various processing stages of the software. Tracing and trapping instructions are typically accomplished in prior art computers by a debug support circuit which is typically connected to a system bus.

Thus, the current solutions for software debugging suffer from a variety of limitations, including: increased packaging and development costs, circuit complexity, processor throttling, and bandwidth matching difficulties. Further, there is currently no adequate low-cost procedure for providing trace information. The limitations of the existing solutions are likely to be exacerbated in the future as internal processor clock frequencies continue to increase.

SUMMARY

It has been discovered that debug logic with a trace memory and controller may be integrated with a microprocessor. The trace controller stores program trace information received from the processor in the trace memory (e.g., an instruction trace buffer). Such a trace buffer and controller may include a method and/or circuit for turning on/off trace operation through the use of breakpoint registers. Such an apparatus and/or method provide an advantage that program tracing may be focused to provide a more specific and relevant trace of program operation for subsequent analysis. A further advantage is that space in a trace buffer or memory is conserved due to the compact nature of the program trace. A further advantage is that registers are dedicated to the trace on/off function and do not have to be shared. Thus, resource conflicts do not occur and do not have to be handled by the processor. Software programming is thereby facilitated.

In one embodiment, a microprocessor includes a processor core, a debug register circuit and a trace unit. The processor core is for processing information according to a program. The program includes a plurality of instructions for execution by the processor core. Each of the plurality of instructions has a corresponding address. The debug register circuit is coupled to the processor core. The debug register circuit includes a dedicated initiate trace breakpoint register coupled to receive and store an initiate trace address and a dedicated terminate trace breakpoint register coupled to receive and store a terminate trace address. The trace unit is coupled to the debug register circuit and the processor core. The trace unit initiates a program trace responsive to the program accessing the initiate trace address. The trace unit terminates the program trace responsive to the program accessing the terminate trace address. The program trace includes information regarding the execution of the program by the microprocessor.

In another embodiment, an information processing system includes a microprocessor core, a debug register, a status indicator and a trace unit. The microprocessor core is for processing information according to each of a plurality of instructions of a program. Each of the plurality of instructions has a corresponding address. The debug register circuit is coupled to the processor core. The debug register circuit includes a first breakpoint and a second breakpoint. The status indicator is coupled to the debug register circuit. The status indicator has a first value responsive to the first breakpoint being the most recently triggered of the first breakpoint and the second breakpoint. The status indicator has a second value responsive to the second breakpoint being the most recently triggered of the first breakpoint and the second breakpoint. The trace unit is coupled to the microprocessor core and the status indicator. The trace unit initiates a program trace responsive to the status indicator having the first value. The trace unit terminates a program trace responsive to the status indicator having the second value.

In another embodiment, a method is provided for tracing the execution of instructions of a program being executed in an information processing system. The method includes the following: setting a first breakpoint to a first address; setting a second breakpoint to a second address; monitoring the first breakpoint to determine if the program accesses the first address; monitoring the second breakpoint to determine if the program accesses the second address; initiating an instruction trace without interrupting the execution of the program when the first address is accessed; and terminating the instruction trace without interrupting the execution of the program when the second address is accessed.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following sets forth a detailed description of a preferred embodiment of the invention. The description is intended to be illustrative of the invention and should not be taken to be limiting. Many variations, modifications, additions, and improvements may fall within the scope of the invention as defined in the claims that follow.

Figure 1:
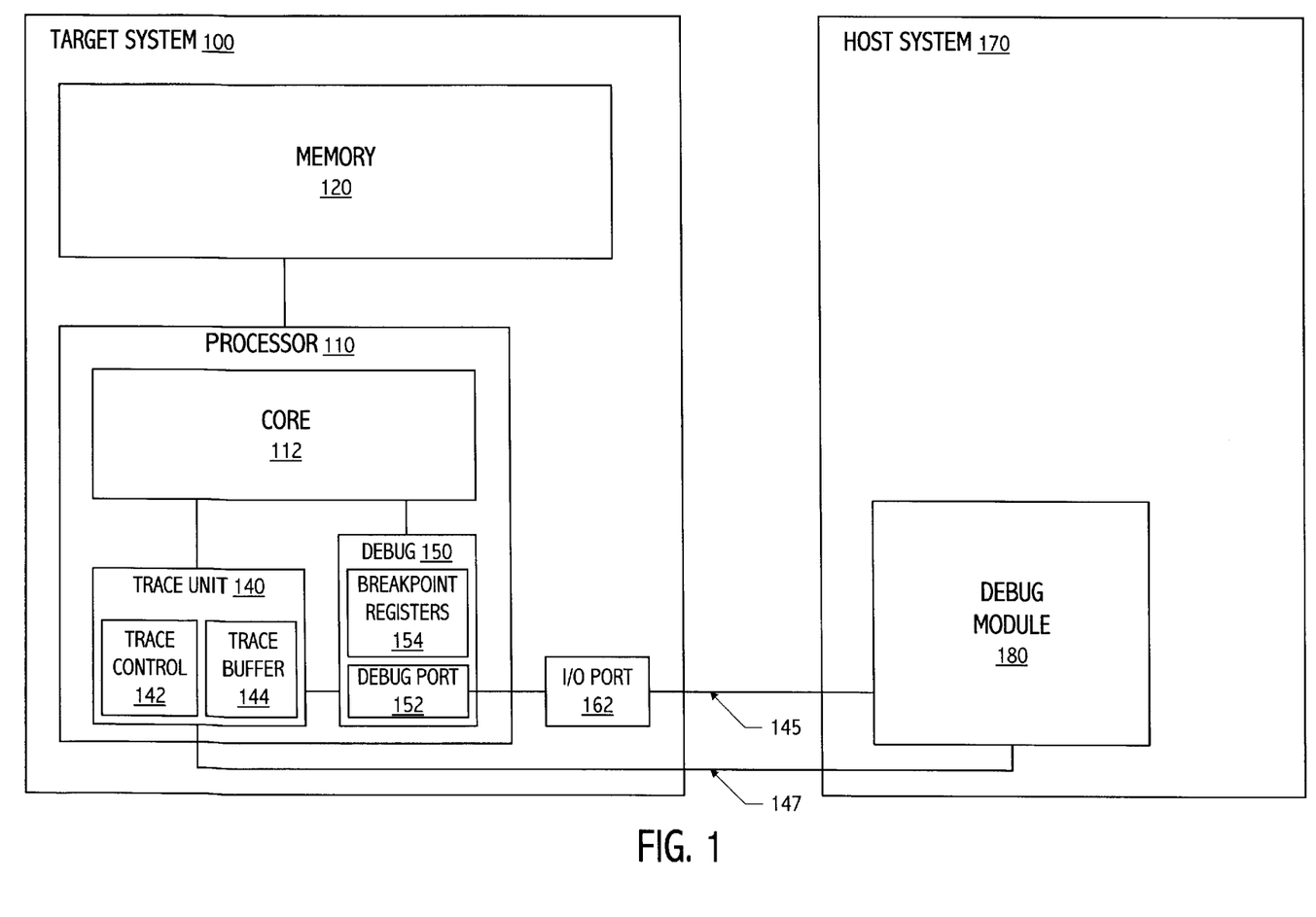
FIG. 1 shows a block diagram of an embodiment of a software debug environment in accordance with the invention.

FIG. 1 depicts an exemplary software debug environment illustrating a contemplated use of the present invention. Target system 100 is coupled to host system 170. Target system 100 includes an embedded microprocessor 110 which is coupled to target system memory 120 and input/output (I/O) port 162. Embedded processor 110 includes processor core 112 which may include an instruction processing unit, various functional units, a cache memory, etc. Processor 110 also includes trace unit 140 and debug unit 150. Processor 110 may include additional circuitry (not shown) for performing application specific functions, or may take the form of a stand-alone processor or digital signal processor. Trace unit 140 includes trace controller 142 and trace buffer 144. Debug unit 150 includes breakpoint registers 154 and debug port 152.

Trace unit 140 augments the capabilities of processor 110 to provide program trace capability. A typical program trace provides a sequence of instruction execution flow. Tracing instructions is useful for developing and debugging computer software or hardware. The trace can assist in understanding how and when problematic or interesting portions of software are entered or exited. As is described hereinafter, trace unit 140 is turned on/off by using breakpoint registers 154 of debug unit 150.

I/O port 162 provides a port for transferring trace information between target system 100 and a host system 170. In one embodiment, host system 170 executes debug control software module 180 for transferring high-level commands and controlling the extraction and analysis of debug information generated by target system 100. Host system 170 and target system 100 communicate via a bus 145. Bus 145 is, for example, a serial bus. Most computers are equipped with a serial or parallel interface which can be inexpensively connected to debug port 152 by means of a serial I/O port 162, allowing a variety of computers to function as host system 170. Alternatively, bus 145 could be replaced with higher speed JTAG-to-network conversion equipment. Debug port 152 preferably uses an IEEE-1149.1-1990 compliant JTAG interface or other similar standardized serial port interface. Bus 147 provides a parallel interface between bond-out pins of processor 110 and host system 170.

Figure 2:
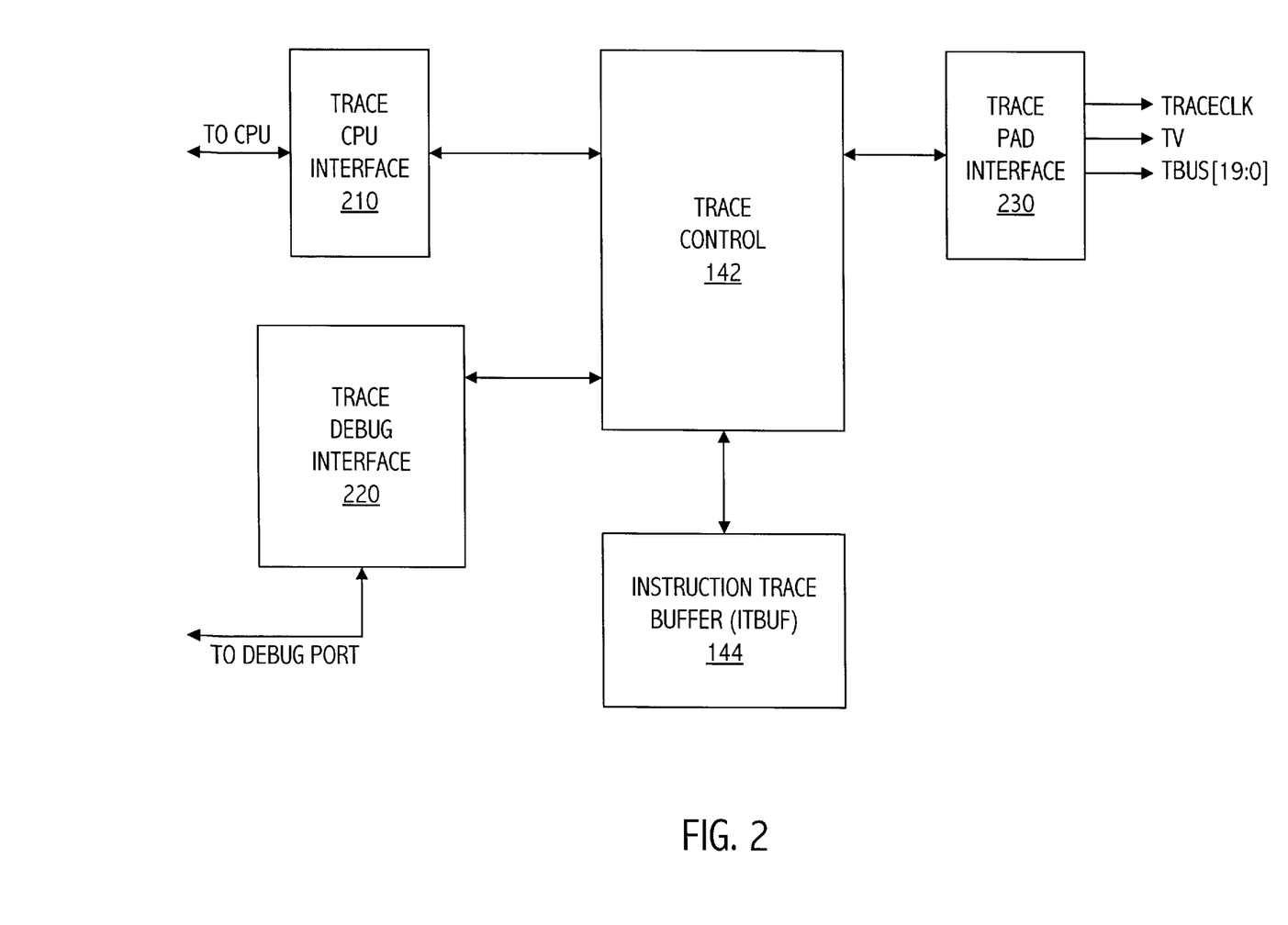
FIG. 2 shows a block diagram of an embodiment of a computer program trace unit in accordance with the invention.

Referring to FIG. 2, trace unit 140 includes trace controller 142, trace buffer 144, CPU interface 210, debug interface 220 and pad interface 230. Trace CPU interface 210 provides an interface to processor core 112. Trace debug interface 220 provides an interface to debug unit 150 (e.g., an IEEE-1149.1-1990 compliant JTAG debug circuit). Trace pad interface 230 provides a parallel interface to bus 147 to provide trace information from trace unit 140 to host system 170. Trace pad interface 230 and debug port 152 provide alternative trace outputs. Trace controller 142 includes control logic for storage and/or retrieval of trace information provided by processor 110 via CPU interface 210. Trace buffer 144 provides storage for the trace information. Trace buffer 144 is a dual-ported random access memory (RAM) design and is organized as 256 entries by 20 bits. Alternatively, trace buffer 144 may have 128 entries or any other number of entries.

Target system 100 can be configured to analyze debug/trace information in either an internal mode or an external mode. In internal mode, trace buffer 144 provides a circular buffer for tracing the execution of a number of program commands. The number of traceable commands depends, for example, on the size of trace buffer 144 and the types of trace events recorded. In external mode, trace buffer 144 provides a temporary buffer for trace information that cannot be output to a host system 170 via a trace output (e.g., trace pad interface 230) as fast as the trace information is generated by target system 110. Trace information stored in trace entries of trace buffer 140 can be retrieved under the control of external commands of host system 170 or of processor 110, and can be used for re-constructing program flow.

Figure 3A:
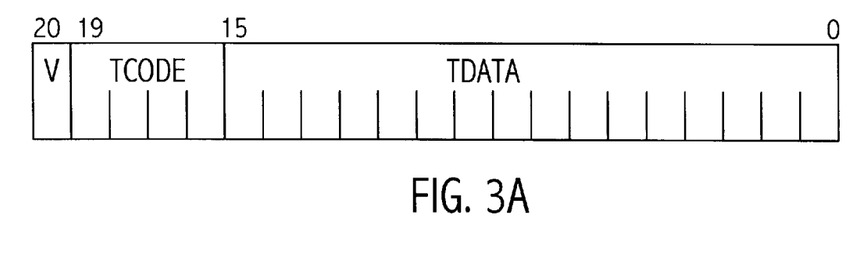
FIG. 3A shows a trace entry of the trace unit of FIG. 2.
Figure 3B:
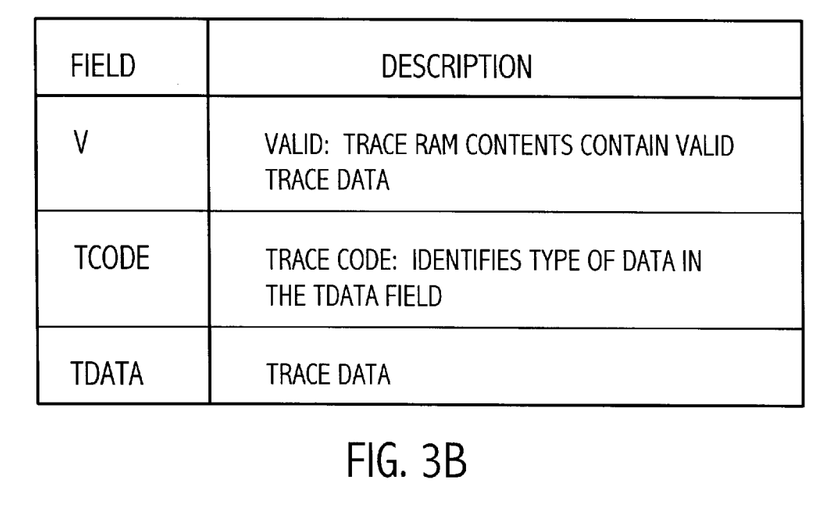
FIG. 3B shows fields of the trace entry of FIG. 3A.

Trace information is received from the processor in bursts. Between any two bursts, there will be an idle time of at least 3 clock cycles. Each new trace information received by the trace controller requires 1–4 entries in the trace buffer. FIGS. 3A and 3B show an exemplary trace entry format.

In external mode, host system 170 executes debug control software module 180 for transferring high-level commands and controlling the extraction and analysis of debug information generated by target system 100. Trace information sent by processor 110 and stored by trace buffer 144 is sent to host system 170 via a trace output (e.g., trace pad interface 230). The trace information is stored in external trace memory of host system 170, which is typically much larger than the internal 256 entry trace buffer 144. The larger trace memory allows for reconstructing program flow fork larger segments of source code. Trace buffer 144 is used only to buffer trace information that cannot be sent immediately to host system 170 due to the mismatch in operating speeds of the trace output(s) and processor 110. Processor 110, for example, may operate at speeds up to 133 Mhz while trace pad interface 230 operates at a speed of 25 Mhz.

Trace information sent from processor 110 is directed either to trace pad 230 or to trace buffer 144 under control of the write state machine of trace controller 142. If trace pad interface 230 is available and there is no previously buffered trace information in trace buffer 144, new trace information is sent directly to trace pad interface 230. If there is previously buffered information in trace buffer 144 and trace buffer 144 is not full, new trace information is sent to trace buffer 144 as during internal mode operation described above. Previously buffered trace information in trace buffer 144 is emptied under the control of a read state machine of trace controller 142. The read state machine of trace controller 142 monitors trace pad interface 230 and whenever trace pad interface 230 is available, trace controller 142 generates the appropriate commands to read trace buffer 144. The contents of trace buffer 144 are then directed to trace pad interface 230.

As noted, trace controller 142 handles trace information received from processor 110. The trace information can be stored temporarily in trace buffer 144. Writes to trace buffer 144 happen when new trace information is received by trace controller 142. Reads from trace buffer 144 happen when a trace output (e.g., pad interface 230 or debug port 152) is available to send out trace data. The reads and writes happen independently of each other and can happen simultaneously.

Trace unit 140 is turned on/off by enabling a debug breakpoint which is detected as part of the execution of an instruction. A breakpoint allows a programmer to set a specific condition at a particular address (e.g., a particular linear address) that causes the computer system to perform a function. Processor 110 supports six simultaneous breakpoint conditions. Each of the six breakpoints is either a general breakpoint or a trace breakpoint. For example processor 110 supports four general breakpoints and two trace breakpoints.

A general breakpoint causes program execution to jump into a debug exception handler when the address is processed by the executing program. Each of the general breakpoints can be one of three different types: (1.) instruction execution only, (2.) data writes, and (3.) data reads or writes (but not instruction execution). Thus, a programmer can set up to four locations in a program for which processor 110 will jump to a debug exception handler. A debug exception handler is a routine that receives control when a debug exception is detected.

The first of the two trace breakpoints is a trace-on instruction breakpoint, and the second of the two trace breakpoints is a trace-off instruction breakpoint Trace breakpoints do not cause exceptions. Instead, the trace breakpoints allow program execution to continue uninterrupted. The trace breakpoints cause external trace trigger indications. For example, the first trace breakpoint provides an indication which causes trace controller 142 to toggle program tracing on, and the second trace breakpoint provides an indication which causes trace controller 142 to toggle program tracing off.

Figure 4:
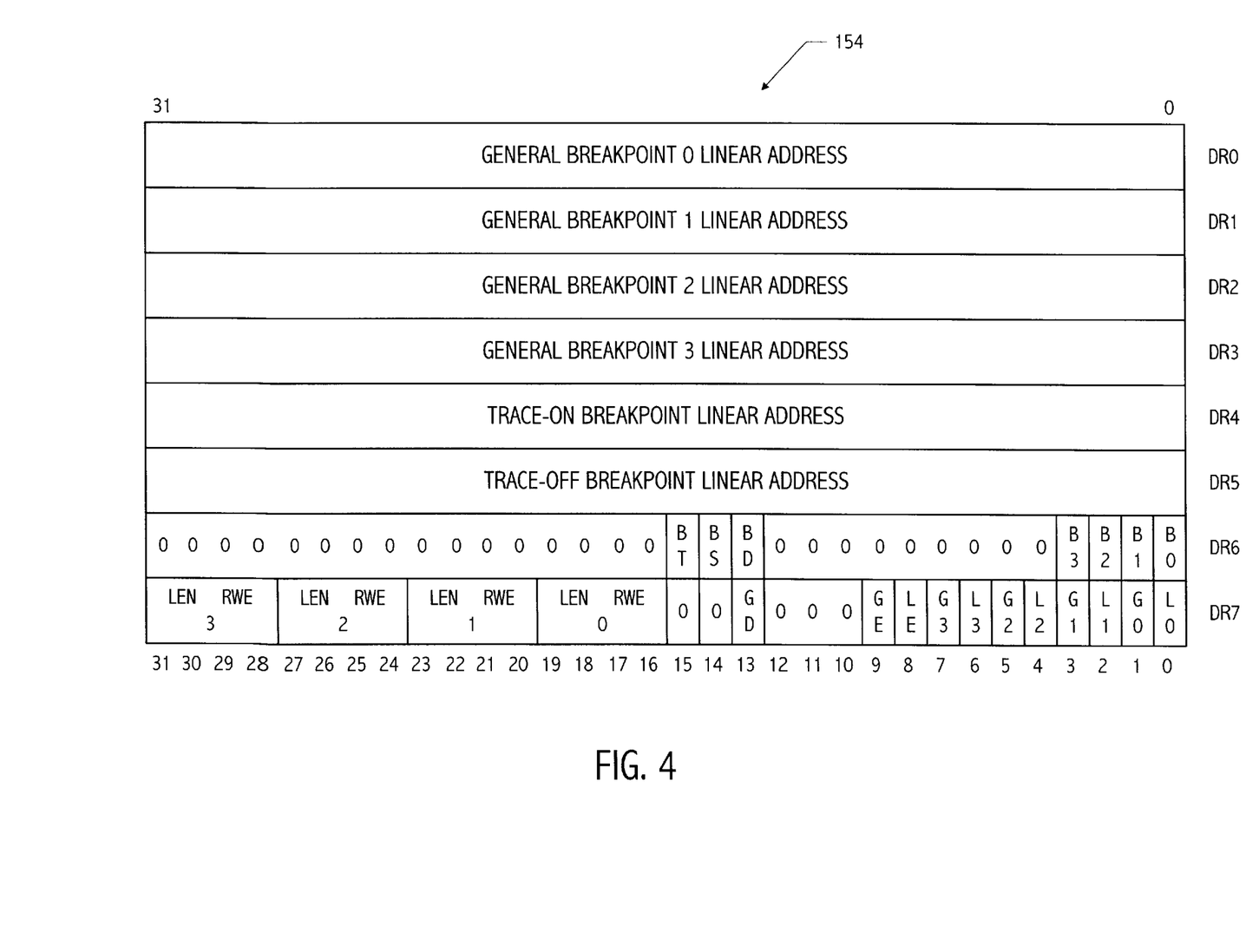
FIG. 4 shows the breakpoint registers of FIG. 1.

Referring to FIG. 4, breakpoint registers 154 of processor 110 include eight debug registers DR0–DR7 to support the six debug breakpoints. Registers DR0–DR3 are general breakpoint registers which can cause exceptions. Registers DR4 and DR5 are trace breakpoint registers which cause external trace trigger indications. Register DR6 is a debug status register. Register DR7 is a debug control register.

The six breakpoint conditions are set by storing an address in one of the six breakpoint registers DR0–DR5. For example, each of registers DR0 through DR3 contain a linear address associated with each of the four corresponding general breakpoint conditions. Registers DR4 and DR5 are additional registers in the presently described embodiment and are undefined in previous x86 architectures. Registers DR4 and DR5 contain linear addresses associated with the trace-on breakpoint condition and the trace-off breakpoint condition, respectively. Additional breakpoint qualifiers are given in DR7. Because the linear address is used in the presently discussed example, the breakpoint facilities operate the same whether paging is enabled or not.

Typically, debug registers DR0–DR7 can only be read or written at privilege level zero. Attempted access at any other privilege level will raise an invalid opcode exception. The registers can be finer protected from reading or writing even at privilege level zero by the BD and GD bits in DR6 and DR7, as is well known in the art.

Access to breakpoint registers DR1–DR3, DR6 and DR7 is provided by the following move to/from debug register instructions:

MOV reg,DRi
MOV DRi,reg where DRi is any one of breakpoint registers DR1–DR3, DR6 and DR7. The use of such MOV instructions is well known in the art.

Access to trace breakpoint registers DR4 and DR5 is provided by the following move to/from debug register instructions:

MOVD R32,DR4
MOVD DR4,R32
MOVD R32,DRl5
MOVD DR5,R32.

A MOVD instruction is an assembly macro which hard codes opcodes into the program. The MOVD instruction allows writes and reads between the trace breakpoint registers DR4 and DR5 and any of the 32-bit general purpose registers (e.g., EAX, EBX, ECX, EDX, etc., depicted generally as R32).

The DR6 register is the debug status register. When a debug exception is raised, processor 110 sets bits in DR6 to indicate the exception type and/or breakpoints that raised the exception. The DR6 BS, BT and BD bits and the use thereof are well known in the art. The B0 through B3 bits in DR6 indicate that the general breakpoint condition specified by the corresponding general breakpoint linear address register was detected. Bits B0–B3 are set even if the corresponding general breakpoint conditions have not been enabled by DR7. Bits 4–12 and 16–31 of debug status register DR6 are reserved.

DR7 is the debug control register. Bits in debug control register DR7 allow each of the general breakpoint registers DR0–DR3 to be enabled and indicate the type of general breakpoint (instruction, data write, and data read or write) for each. Furthermore, the protection of the general breakpoint registers is specified in this register.

Bits L0–L3 and G0–G3 of debug control register DR7 are the local and global enable signals for the four general breakpoint registers. If either the local or global enable ($L_i$ or $G_i$) is set, the general breakpoint specified by the corresponding general breakpoint register DRi is enabled. The L bits (LE and L0–L3) are local bits to a task. The L bits allow debug conditions to be enabled for a particular task. The G bits (GD, GE and G0–G3) are global bits and should be used for debug conditions that are true for all tasks in the system. The L bits are automatically cleared at each task switch by the processor.

The four 2-bit LEN fields in DR7 indicate the length of the general breakpoint for each of the four general breakpoint registers. If the corresponding general breakpoint is an instruction execution breakpoint (denoted by RWE=00), LEN must be 00. The four 2-bit RWE fields indicate the type of access that will cause a general breakpoint exception to be raised. The function and use of the GE/LE bits of debug control register DR7 is well known in the art.

The combination of each LEN field and the corresponding breakpoint linear address stored in DR0–DR3 specify the four linear address ranges that are checked for debug exceptions. The breakpoint linear address must be aligned at addresses that are multiples of the length specified in LEN. In fact, the processor ignores low-order linear address bits when checking for breakpoints, depending on the LEN specification. For example, if LEN=11 (length of 4), the low 2 bits of the linear address are ignored. If LEN=01 (length of 2), the low bit of the linear address is ignored.

An access of the correct type of any byte in the address range specified by the general breakpoint linear address and LEN will cause an exception. Every data access and instruction fetch is checked against all four general breakpoint address ranges. If any byte of the general breakpoint address range matches and the type of access matches (for instance, data read), a general breakpoint exception is reported.

Figure 6:
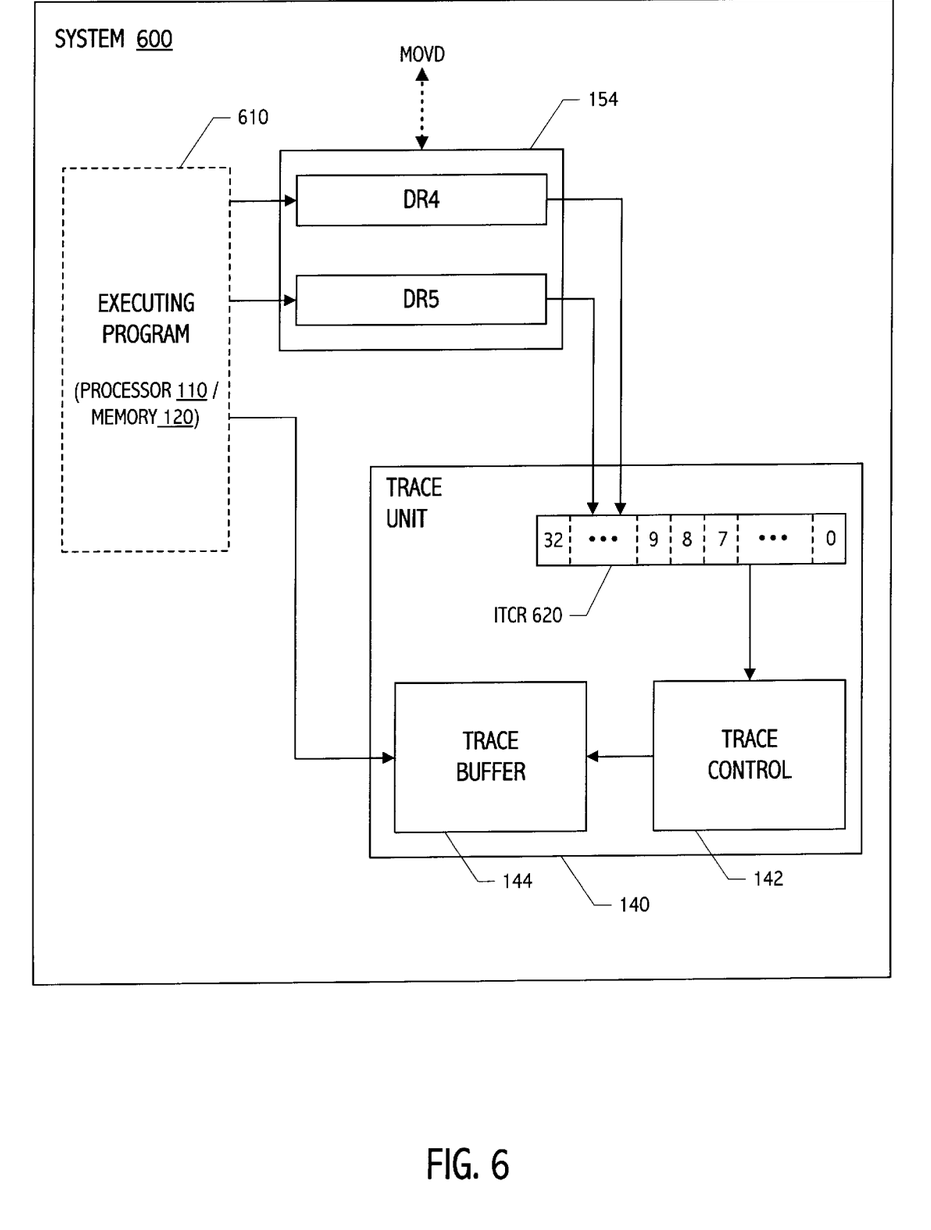
FIG. 6 shows a block diagram of an embodiment of an information processing system in accordance with the invention.

FIG. 6 shows an information processing system 600 operating in accordance with the invention. In operation, system 600 includes an executing program 610 being executed by processor 110 and Memory 120. Breakpoint registers 154 include registers DR4 and DR5. Trace unit 140 includes trace controller 142, trace buffer 144 and instruction trace configuration register (ITCR) 620. The instruction trace control register (ITCR) provides status and control for trace breakpoint registers DR4 and DR5.

A trace on (TRON) bit 7 of the ITCR indicates whether trace is on or off and enables and disables tracing on the next instruction boundary without affecting the execution of the program 610 and without affecting the pointers of instruction trace buffer 144. The TRON bit reflects trace on and trace off status and can be set or cleared when processor 110 detects a breakpoint register DR4 or DR5 match, respectively. For example, a hit on the address stored in trace on breakpoint register DR4 sets TRON, thereby enabling tracing. Also, a hit on the address stored in trace off breakpoint register DR5 clears TRON, thereby disabling tracing. Trace off breakpoint register DR5 has priority over trace on breakpoint register DR4 so that if a breakpoint register match occurs with both registers DR4 and DR5 at the same time, trace is turned off. The TRON bit will always accurately reflect the status of trace capture. If trace capture is turned on due to an occurrence of a trace control breakpoint (e.g., DR4) while the TRON bit is cleared, the TRON bit will be set to 1. If trace capture is turned off due to an occurrence of a trace control breakpoint (e.g., DR5) while the TRON bit is set, the TRON bit will be cleared to 0.

Bits 9:8 (EN_TRACE_OFF, EN_TRACE_ON) of the ITCR allow a user to map the DR5, DR4 breakpoint registers as trace control breakpoints. The DR4 breakpoint register is used to turn trace on if the EN_TRACE_ON bit 8 is set to 1, and the DR5 breakpoint register is used to turn trace off if the EN_TRACE_OFF bit 9 is set to 1. When using this feature, the developer may enable and disable trace unit 140 on the occurrence of particular instructions so that only selected portions of code are traced, thereby conserving space in trace buffer 144 and allowing for more focused code tracing. When processor 110 hits a breakpoint which is mapped as a trace control breakpoint (e.g., DR4, DR5), processor 110 is not stopped. The instruction trace stream is turned on (e.g., DR4) or off (e.g., DR5) as enabled by the EN_TRACE_OFF, EN_TRACE_ON bits 9:8.

The instruction trace configuration register (ITCR) may be accessed by either the serial/parallel interface or by a reserved opcode when X86 enhanced software debug mode is enabled. The developer must ensure that these two access modes are not used simultaneously.

As shown in FIG. 6, an initiate trace address is stored in initiate trace register DR4, and a terminate trace address is stored in terminate trace register DR5 by using MOVD instructions. When an instruction is executed by program 610 which has an address or which otherwise accesses an address which matches the initiate trace address stored in register DR4, trace on bit 7 of ITCR 620 is set. When ITCR bit 7 is set, trace controller 142 enables trace buffer 144 to record trace information regarding the next executed instruction of program 610. Alternatively, the trace information may be ported to an external memory or other device for processing. (See, e.g., FIG. 1.) Trace information is recorded for each successive instruction until an program 610 accesses an address matching the terminate trace address stored in register DR5. When an address is accessed by program 610 which matches the terminate trace address stored in register DR5, trace on bit 7 of ITCR 620 is cleared. When ITCR bit 7 is clear, trace controller 142 disables trace buffer 144 (or the external memory or device) from recording trace information regarding the next executed instruction of program 610. No trace information is recorded regarding each successive instruction until an address is accessed by program 610 that again matches the initiate trace address stored in register DR4.

Figure 5:
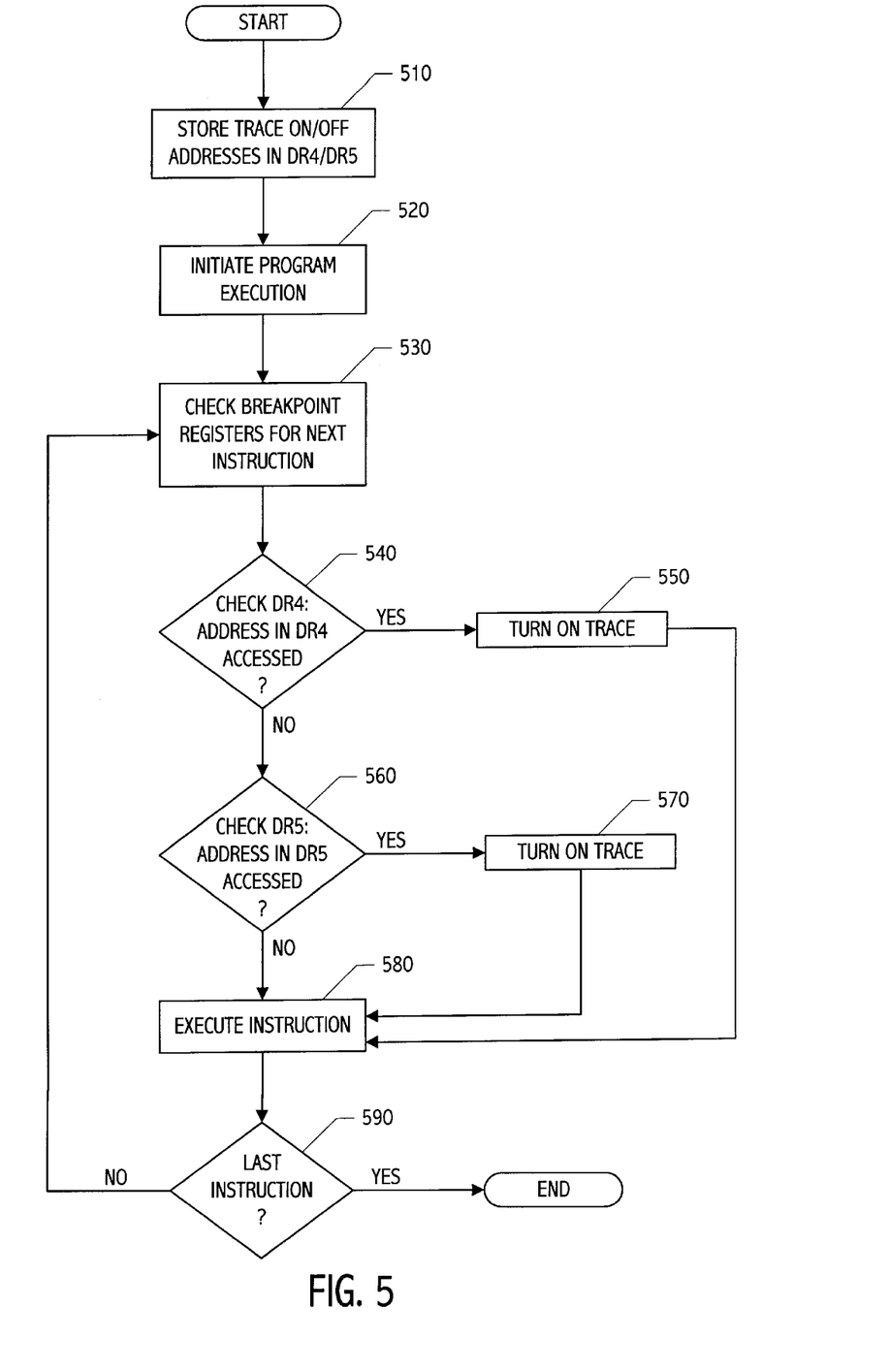
FIG. 5 shows a flow chart of a method of turning trace on/off using the breakpoint registers of FIG. 1.

Referring to FIG. 5, when a trace is desired for a segment of a program's execution, the addresses of the instructions at the boundaries of the segment are stored in the respective debug registers during store operation 510. Specifically, the instruction at the beginning of the segment is placed in debug register DR4 using a MOVD DR4, reg command, and the instruction at the end of the segment is placed in debug register DR5 using a MOVD DR5, reg command.

After store operation 510 and during initiate operation 520, program execution is initiated. During program execution, various instructions of the program are accessed at corresponding addresses by processor 110.

Prior to execution of each instruction, the address of each instruction is checked for a matching address stored in a debug register during check breakpoint operation 530. If the address of the next instruction to be executed is determined to match the address stored in DR4 at check DR4 decision 540, the trace function is turned on at turn on trace operation 550. After check DR4 decision 540, if the address of the next instruction to be executed is determined to match the address stored in DR5 at check DR5 decision 560, the trace function is turned off at turn off trace operation 570. Thus, if the instruction address matches both of the addresses stored in debug registers DR4, DR5, trace is turned off.

After either of turn on trace operation 550 and turn off trace operation 570, the next instruction is executed at execute operation 580. Trace information is generated regarding the execution of the next instruction depending on the outcome of check DR4 operation 540 and check DR5 operation 560.

After execute operation 580 and during last instruction decision 590, processor 110 determines if the instruction executed during execute operation 560 is the last instruction. If the instruction is the last instruction, processing is ended. If the instruction is not the last instruction, processing continues at check breakpoint 530.

Thus, when a trace is desired for a segment of a program's execution, the addresses of the instructions at the beginning and end of the segment are stored in respective debug registers DR4, DR5. When the address of the instruction at the beginning of the segment is accessed during program execution, the debug handler will turn the trace function on. That is, when an address is accessed that matches the address stored in debug register DR4, a signal is provided to trace controller 142 to initiate tracing by trace unit 140. Similarly, when the address of the instruction at the end of the segment is accessed during program execution, the debug handler will turn the trace function off. When an address is accessed that matches the address stored in debug register DR5, a signal is provided to trace controller 142 to terminate tracing by trace unit 140. While the trace function is on, trace information is provided as described above. Thus, trace information is substantially transparently collected for a desired program execution segment.

In one embodiment, trace on/off function using breakpoint registers is embodied within a computer system. In another embodiment, a trace on/off function using breakpoint registers is embodied within a microprocessor. A typical microprocessor is a semiconductor die containing the components of a computer central processor, complete with instruction processing unit, arithmetic, interrupt, and basic communication facilities. A microcontroller is a microprocessor with peripherals on the same integrated circuit chip. Such peripherals may include various types of memory elements, interrupt structures, timers, counters, communication ports and buffers, and I/O and/or data acquisition circuits possibly including analog/digital and digital/analog converters. A microprocessor may or may not be included in a computer system or embedded in a larger system.

While the invention has been described with reference to various embodiments, it will be understood that these embodiments are illustrative and that the scope of the invention is not limited to them. Many variations, modifications, additions, and improvements of the embodiments described are possible.

For example, exemplary processor 110 of FIG. 1 is an SLE486 processor available from Advanced Micro Devices, Inc. of Sunnyvale, Calif. The SLE486 is compatible with the x86 microprocessor architecture which has gained widespread acceptance. The x86 architecture introduced in the i386™ microprocessor is also the basic architecture of both the i486™ and Pentium™ families of microprocessors, all available from the Intel Corporation of Santa Clara, Calif. Other embodiments of the invention may include these or other x86 compatible processors which execute according to an x86 instruction set architecture and which are available from Intel Corporation and from other manufacturers. Also, other embodiments may include a processor or processors having other architectural types such as the Motorola 680x0 architecture. Microprocessors of the Motorola 680x0 family are available from Motorola Inc. of Schaumburg, Ill.

Furthermore, those skilled in the art will recognize that circuit elements in circuit diagrams and boundaries between logic blocks are merely illustrative and that alternative embodiments may merge logic blocks or circuit elements or impose an alternate decomposition of functionality upon various logic blocks or circuit elements. For example, an indicator may provide a corresponding indication through any appropriate structure such as a bit or a plurality of bits in a register or a plurality of registers or a location in a memory. Moreover, alternative embodiments may include multiple instances of a particular component.

Furthermore, those skilled in the art will recognize that boundaries between the functionality of the above described operations are merely illustrative. The functionality of multiple operations may be combined into a single operation, and/or the functionality of a single operations may be distributed in additional operations in accordance with the invention.

The above description is not intended to present an exhaustive list of embodiments of the invention. Although an attempt has been made to outline some exemplary variations, other variations are within the scope of invention as defined in the claims below.

What is claimed is:

1. A microprocessor comprising:
   a processor core for processing information according to a program, the program including a plurality of instructions for execution by the processor core, each of the plurality of instructions having a corresponding address;
   a debug register circuit coupled to the processor core, the debug register circuit including
      a dedicated initiate trace breakpoint register coupled to receive and store an initiate trace address; and
      a dedicated terminate trace breakpoint register coupled to receive and store a terminate trace address;
   a trace unit coupled to the debug register circuit and the processor core, the trace unit initiating a program trace responsive to the program accessing the initiate trace address, the trace unit terminating the program trace responsive to the program accessing the terminate trace address, the program trace including information regarding the execution of the program by the microprocessor.

2. The microprocessor of claim 1 wherein the trace unit comprises:
   an instruction trace configuration register coupled to the debug register circuit for controlling initiation and termination of the program trace, the instruction trace configuration register including a trace on indicator, the trace on indicator having a first value indicating that the program trace is enabled after the program accesses the initiate trace address, the trace on indicator having a second value indicating that the program trace is not enabled after the program accesses the terminate trace address.

3. The microprocessor of claim 2 wherein the trace on indicator has the second value indicating that the program trace is not enabled after the program accesses both the initiate trace address and the terminate trace address at the same time.

4. The microprocessor of claim 2 wherein
   the trace on indicator includes a trace on bit, the trace on bit having the first value after the program accesses the initiate trace address and the second value after the program accesses the terminate trace address;
   the first value is logical high; and
   the second value is logical low.

5. The microprocessor of claim 2 wherein the instruction trace configuration register further comprises:
   an enable trace on indicator, the enable trace on indicator having a first value for enabling the initiate trace breakpoint register so that the trace unit initiates a program trace without interrupting the execution of the program by the processor core when the address stored in the initiate trace breakpoint register is accessed; and
   an enable trace off indicator, the enable trace off indicator having a first value for enabling the terminate trace breakpoint register so that the trace unit terminates the program trace without interrupting the execution of the program by the processor core when the address stored in the terminate trace breakpoint register is accessed.

6. The microprocessor of claim 5 wherein
   the enable trace on indicator includes a bit having the first value of the enable trace on indicator;
   the enable trace off indicator includes a bit having the first value of the enable trace off indicator;
   each of the first value of the enable trace on indicator and the first value of the enable trace off indicator is equal to a logical high.

7. The microprocessor of claim 1 wherein
   the microprocessor is an x86 type microprocessor;
   the initiate trace breakpoint register is a DR4 debug register; and
   the terminate trace breakpoint register is a DR5 debug register.

8. The microprocessor of claim 7 further comprising:
   a debug status register DR6;
   a debug control register DR7, the debug control register including an indicator for enabling the initiate and terminate trace breakpoint registers.

9. The microprocessor of claim 8 wherein the indicator for enabling the initiate and terminate trace breakpoint registers is bit 12 of debug control register DR7.

10. The microprocessor of claim 1 operating according to an instruction set architecture comprising:
    a move instruction for storing a first address in the initiate trace breakpoint register, the program trace being initiated when the first address is called during execution of the program; and
    a move instruction for storing a second address in the terminate trace breakpoint register, the program trace being terminated when the second address is called during execution of the program.

11. The microprocessor of claim 10, wherein the instruction set architecture further comprises:
   a move instruction for reading the initiate trace address from the initiate trace breakpoint register; and
   a move instruction for reading the terminate trace address from the terminate trace breakpoint register.

12. The microprocessor of claim 11, wherein
   the microprocessor is an x86 type microprocessor;
   the move instruction for storing a first address in the initiate trace breakpoint register is a MOVD DR4, R32 instruction;
   the move instruction for storing a second address in the terminate trace breakpoint register is a MOVD DR5, EAX instruction;
   the move instruction for reading the initiate trace address from the initiate trace breakpoint register is a MOVD EAX, DR4 instruction; and
   the move instruction for reading the terminate trace address from the terminate trace breakpoint register is a MOVD EAX, DR5 instruction.

13. The microprocessor of claim 1 wherein the processor core comprises:
   an instruction processing unit for processing each of the plurality of instructions of the program; and
   a plurality of functional units for processing data information in accordance with the plurality of instructions of the program.

14. The microprocessor of claim 1 coupled within a computer system, the computer system comprising:
   the microprocessor; and
   a memory coupled to the microprocessor.

15. An information processing system comprising:
   a microprocessor core for processing information according to each of a plurality of instructions of a program, each of the plurality of instructions having a corresponding address;
   a debug register circuit coupled to the processor core, the debug register circuit including
      a first breakpoint; and
      a second breakpoint;
   a status indicator coupled to the debug register circuit, the status indicator having a first value responsive to the first breakpoint being most recently triggered of the first breakpoint and the second breakpoint, the status indicator having a second value responsive to the second breakpoint being most recently triggered of the first breakpoint and the second breakpoint; and
   a trace unit coupled to the microprocessor core and the status indicator, the trace unit initiating a program trace responsive to the status indicator having the first value, the trace unit terminating a program trace responsive to the status indicator having the second value.

16. The system of claim 15 wherein the status indicator has the second value responsive to the first and second breakpoint being triggered simultaneously.

17. The system of claim 15 wherein
   the status indicator includes a trace on bit, the trace on bit having the first value responsive to the first breakpoint being most recently triggered of the first breakpoint and the second breakpoint, the trace on bit having the second value responsive to the second breakpoint being most recently triggered of the first breakpoint and the second breakpoint
   the first value is logical high; and
   the second value is logical low.

18. The system of claim 15, wherein
   the first breakpoint includes a dedicated initiate trace debug register coupled to receive and store an initiate trace address; and
   the second breakpoint includes a dedicated terminate trace debug register coupled to receive and store a terminate trace address.

19. The system of claim 18, wherein
   the microprocessor core operates according to an x86 instruction set architecture;
   the initiate trace debug register is a DR4 debug register; and
   the terminate trace debug register is a DR5 debug register.

20. The system of claim 18 further comprising:
   an instruction trace configuration register coupled to the debug register circuit and the trace unit, the instruction trace configuration register including the status indicator, the status indicator having the first value indicating that the program trace is enabled after the program accesses the initiate trace address, the status indicator having the second value indicating that the program trace is not enabled after the program accesses the terminate trace address.

21. The system of claim 20 wherein the instruction trace configuration register further comprises:
   an enable trace on indicator, the enable trace on indicator having a first value for enabling the initiate trace debug register so that the trace unit initiates a program trace without interrupting the execution of the program by the processor core when the address stored in the initiate trace debug register is accessed; and
   an enable trace off indicator, the enable trace off indicator having a first value for enabling the terminate trace debug register so that the trace unit terminates the program trace without interrupting the execution of the program by the processor core when the address stored in the terminate trace debug register is accessed.

22. The system of claim 18 operating according to an instruction set architecture comprising:
   a move instruction for storing a first address in the initiate trace debug register, the program trace being initiated when the first address is called during execution of the program; and
   a move instruction for storing a second address in the terminate trace debug register, the program trace being initiated when the second address is called during execution of the program.

23. The system of claim 15 further comprising:
   an x86 type microprocessor, the x86 type microprocessor including the microprocessor core, the debug register circuit and the trace unit.

24. The system of claim 23 further comprising:
   a computer system, the computer system including the microprocessor; and
   a memory coupled to the microprocessor.

25. A method for tracing the execution of instructions of a program being executed in an information processing system, the method comprising:
   setting a first breakpoint to a first address;
   setting a second breakpoint to a second address;
   monitoring the first breakpoint to determine if the program accesses the first address;
   monitoring the second breakpoint to determine if the program accesses the second address;

initiating an instruction trace without interrupting the execution of the program when the first address is accessed; and terminating the instruction trace without interrupting the execution of the program when the second address is accessed.

26. The method of claim 25, wherein the setting the first breakpoint includes storing the first address in a dedicated initiate trace breakpoint register of the information processing system;

the setting the second breakpoint includes storing the second address in a dedicated terminate trace breakpoint register of the information processing system.

27. The method of claim 26, wherein the information processing system includes a processing unit operating according to an x86 instruction set architecture;

the dedicated initiate trace breakpoint register is a DR4 debug register; and the dedicated terminate trace breakpoint register is a DR5 debug register.

28. The method of claim 26, wherein the method further comprises executing a plurality of instructions by a processing unit of the information processing system, each of the instructions having a corresponding address;

the monitoring the first breakpoint includes monitoring the instructions being executed by the processing unit; and monitoring the initiate trace breakpoint register;

determining if an address of an instruction being executed matches the first address stored in the initiate trace breakpoint register;

setting a trace on indicator in an instruction trace configuration register to a first value if the address of the instruction being executed matches the second address;

the monitoring the second breakpoint includes monitoring the instructions being executed by the processing unit; and monitoring the terminate trace breakpoint register;

determining if an address of an instruction being executed matches the second address stored in the terminate trace breakpoint register; and setting a trace on indicator in an instruction trace configuration register to a second value if the address of the instruction being executed matches the second address.

29. The method of claim 28, wherein the trace on indicator is set to the second value if the address of the instruction being executed matches the first and second addresses.

30. The method of claim 28, wherein the instruction trace i s initiated if the trace on indicator changes from the second value to the first value; and the instruction trace is terminated if the trace on indicator changes from the first value to the second value.

31. The method of claim 28, wherein the initiating the instruction trace includes performing an instruction trace for the next instruction if the trace on indicator has the first value; and the terminating the instruction trace includes not performing an instruction trace for the next instruction if the trace on indicator has the second value.

32. The method of claim 25, wherein the second breakpoint has priority over the first breakpoint when the first and second addresses are accessed by the program at the same time.

33. The method of claim 25, wherein the setting the first breakpoint includes storing the first address in a dedicated initiate trace breakpoint register of the information processing system;

the setting the second breakpoint includes storing the second address in a dedicated terminate trace breakpoint register of the information processing system;

the method further comprises executing a plurality of instructions by a processing unit, each of the instructions having a corresponding address;

the monitoring the first breakpoint includes monitoring the instructions being executed by the processing unit; and monitoring the initiate trace breakpoint register;

determining if an address of an instruction being executed matches the first address stored in the initiate trace breakpoint register;

the monitoring the second breakpoint includes monitoring the instructions being executed by the processing unit; and monitoring the terminate trace breakpoint register;

determining if an address of an instruction being executed matches the second address stored in the terminate trace breakpoint register;

the initiating the instruction trace includes setting an indicator in an instruction trace configuration register to turn on instruction tracing without interrupting the execution of the program; and terminating the instruction trace includes setting the indicator in the instruction trace configuration register to turn on instruction tracing without interrupting the execution of the program.

34. An apparatus for controlling the tracing of a program execution flow in a microprocessor, the apparatus comprising:

a microprocessor core for processing information according to a program, the program including a plurality of instructions for execution by the processor core, each of the plurality of instructions having a corresponding address;

a debug register circuit including first and second breakpoints;

means for setting the first breakpoint to an initiate trace address;

means for setting the second breakpoint to a terminate trace address;

means for monitoring the first and second breakpoints within the debug circuit to determine whether the initiate and terminate trace addresses are accessed during execution of the program;

means for initiating a program trace when the initiate trace address is accessed by the program; and means for terminating the program trace when the terminate trace address is accessed by the program.

* * * * *